May 6, 1941.  R. A. WERTS  2,241,286
FLUID METERING APPARATUS
Filed Aug. 5, 1940
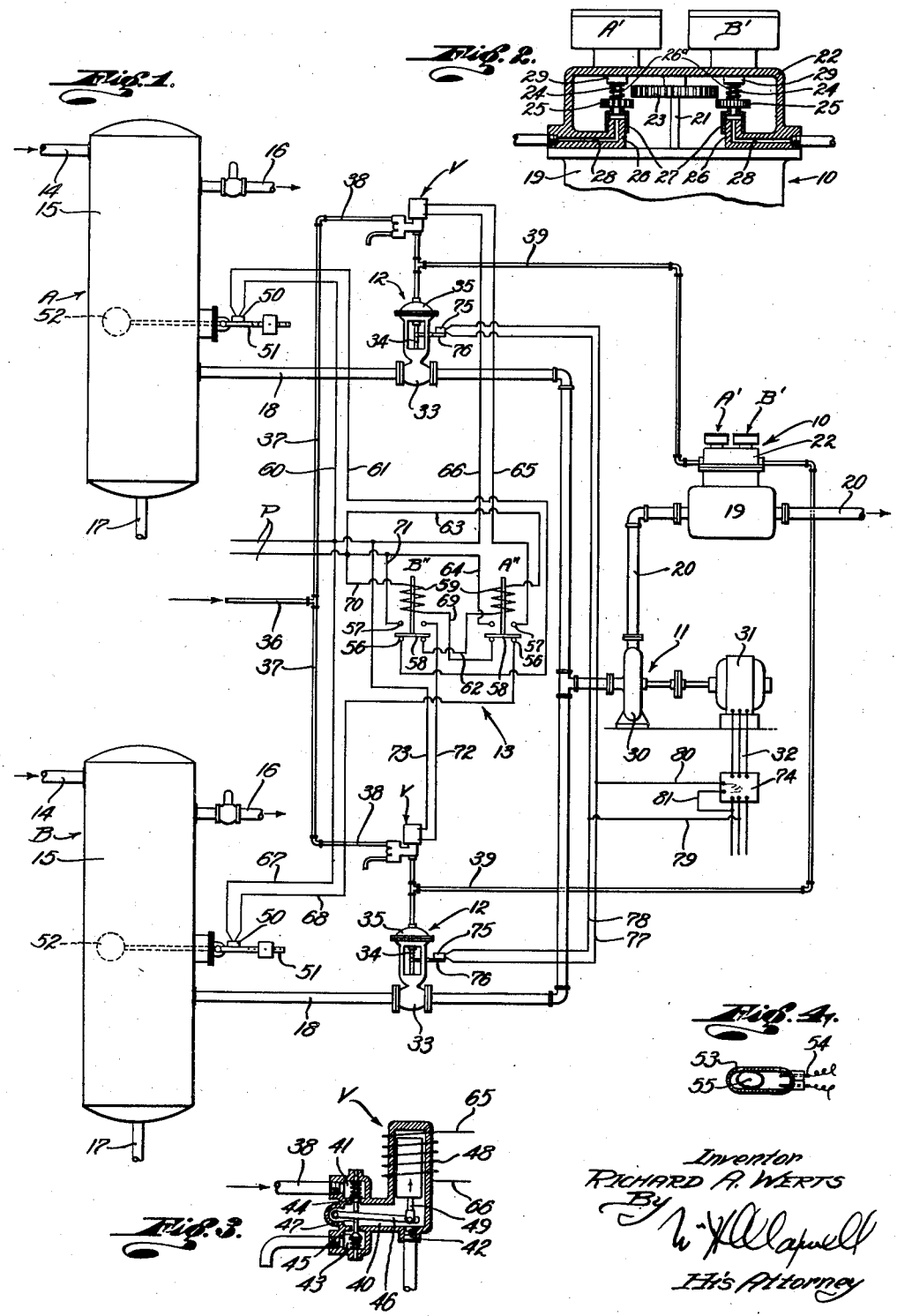
Inventor
RICHARD A. WERTS
By
His Attorney Patented May 6, 1941

2,241,286

UNITED STATES PATENT OFFICE 2,241,286

FLUID METERING APPARATUS

Richard A. Werts, Los Angeles, Calif., assignor of one-fourth to Arthur L. Armentrout, one-fourth to Elwin B. Hall, and one-fourth to Virgil P. Baker, all of Los Angeles, Calif.

Application August 5, 1940, Serial No. 351,449

12 Claims. (Cl. 73—200)

This invention relates to metering equipment and relates more particularly to apparatus for metering fluid from a plurality of sources. A general object of this invention is to provide a dependable and simplified apparatus for accurately metering fluid from a multiplicity of fluid sources.

In many situations it is necessary to meter fluid received or flowing from a number of sources. For example, in the oil fields it is customary to meter the crude oil produced by the individual wells before conducting it to a common pipe line. In such cases it is the usual practice to install separate metering and pumping equipment to handle the production from each individual well. The metering apparatus and the equipment associated therewith are expensive and an installation for handling the production from a plurality of wells is very costly.

An object of the present invention is to materially reduce the amount of the equipment required to meter the production of fluid from a plurality of fluid sources, such as wells, with a proportionate reduction in the cost of the installation.

Another object of this invention is to provide metering equipment of the character referred to in which a single pump may handle the fluid from the several sources or wells.

Another object of this invention is to provide a metering apparatus of the character referred to that accurately meters the flow from the independent sources, embodying a novel control means which positively prevents credit being given to the wrong fluid source.

Another object of this invention is to provide metering equipment of the character referred to that is entirely automatic in operation, requiring no manual control, regulation or attention.

A further object of this invention is to provide a fluid metering apparatus of the character referred to which embodies a minimum number of units or elements and is inexpensive to manufacture, install and operate.

The various objects and features of my invention will be fully understood from the following detailed description of a typical preferred form and application of the invention, throughout which description reference is made to the accompanying drawing, in which:

Fig. 1 is a diagrammatic view of a typical embodiment of the invention illustrating the various piping circuits and wiring circuits. Fig. 2 is an enlarged fragmentary vertical detailed sectional view of a portion of the metering means illustrating the mechanisms for operatively connecting the individual register units with the meter shaft. Fig. 3 is an enlarged vertical detailed sectional view of one of the control valves or pilot valves and Fig. 4 is an enlarged sectional view of one of the switches.

The novel metering equipment of the present invention is adapted for use in numerous situations and the invention is capable of embodiment in various forms. I will herein describe the typical form of the invention illustrated in the drawing, which is designed to meter the fluid from a plurality of wells such as oil wells, it being understood that the invention is not restricted to this particular embodiment or use and that the invention contemplates the metering of fluid from any number of sources.

The form of the invention illustrated in the drawing may be said to comprise, generally, a plurality of sources of fluid A and B, metering means 10 having a plurality of recording or registering units A' and B', pump means 11 for transferring fluid from the sources A and B to the metering means 10, remotely controlled valve means 12 for controlling the delivering of fluid from the sources A and B and a control 13 responsive to conditions at the sources A and B for governing the metering means 10, the valve means 12 and the pump means 11.

The fluid sources A and B may vary greatly in character in different installations and applications of the invention. In the case illustrated the sources A and B each include a line or pipe 14 which may be considered as conducting crude oil from a well. The pipes 14 deliver the fluid or oil to receiving tanks 15. The tanks 15 may be in the form of separators or scrubbers in which the gas and solid matter, such as sand, are separated from the crude oil. Such separators or scrubbers are well known to those skilled in the art and any selected or preferred form of separator may be employed. Each separator or tank 15 has an outlet 16 for the gas, a dump or outlet 17 for the solid matter, and an outlet pipe 18 for the liquid or oil.

The metering means 10 is provided to measure and record or register the amount of fluid supplied by the individual sources A and B. The metering means 10 comprises a meter 19 having a plurality of recorders or registers A' and B'. It is an important feature of the invention that only a single meter 19 is required to measure or meter the fluid delivered by the several individual fluid sources with which the equipment is connected. The liquid or oil outlet pipes 18, from the plurality of fluid sources, extend to a common manifold or pipe 20 and the meter 19 is interposed in this common line to meter the fluid that flow therethrough. The present invention is not primarily concerned with the details of the meter 19 and any appropriate or selected form of meter may be employed. The meter 19 drives or rotates a shaft 21 which extends into a head 22 on the upper side of the meter. The shaft 21 is the register-driving shaft of the meter and its rotation bears a given relation to the quantity of fluid passed by the meter 19.

The above mentioned recording units or registering units A' and B' of the metering means 10 may be mounted on the meter head 22 in spaced adjacent relation. The registering units A' and B' are selectively and independently engaged with and disconnected from the meter shaft 21 by the action of the control 13. The means for selectively operating or driving the registering units A' and B' may vary considerably. As illustrated in Fig. 2 of the drawing the meter shaft 21 may carry a gear 23 and each of the registering units A' and B' may have a shaft 24 extending into the head 22 in parallel relation with the shaft 21. A pinion 25 is slidably keyed or splined on each shaft 24 and is adapted to be moved into and out of mesh with the gear 23.

Separate or individual fluid pressure actuated means may be employed to move the pinions 25 into mesh with the gear. Fixed rams or plungers 26 are provided in the head 22 at the lower ends of the shafts 24 and shiftable cylinders 27 engage down over the stationary plungers. The cylinders 27 may be connected to the pinions 25 or may merely engage against the lower sides of the pinions. Ports 28 in the head 22 extend to the upper ends of the rams or plungers 26 to deliver fluid under pressure to the cylinders 27. Stops 29 may be provided on the upper wall of the head 22 to limit the upward movement of the pinions 25 and to stop or locate the pinions where they mesh with the gear 23. It will be seen that the delivery of a suitable fluid under pressure to a cylinder 27 results in upward movement of the related pinion 25 so that it is brought into mesh with the gear 23 to provide for the driving of the shaft 24 by the meter 19. Springs 26a may be provided to return the pinions.

The pump means 11 is not always essential, for example, it is not required where the fluid is transferred from the fluid sources by a gravity feed. However, in an installation of the character illustrated it is preferred to provide a pump means 11 to ship or transfer the fluid from the individual sources A and B to the metering means 10 and the common pipe line 20. It is a feature of the invention that a common or single pump means 11 operates to handle the fluid from the several fluid sources. The pump means 11 includes a suitable pump 30 connected in the manifold or common pipe 20 to handle all the fluid that passes through the meter 19. The pump 30 is driven by a power means capable of effective control by an electrical control means. As illustrated in the drawing, an electric motor 31 may drive the pump 30. Current for the operation of the motor 31 is carried by suitable power leads 32.

The valve means 12 govern the discharge or delivery of the fluid from the sources A and B and are under the control of the control means 13. There is a valve means 12 for the outlet pipe 18 of each tank 15. The means 12 constitute valves of suitable or selected type and capable of control and operation by applied fluid pressure such as gas pressure. In the typical case illustrated the means 12 include valves 33 connected in the pipes 18 and embodying shiftable operating stems 34. The valve stems 34 extend to operating chambers or diaphragm chambers 35 and the valves 33 may be of the type generally known as regulating valves or regulators. In the present case it will be assumed that the valves 33 are closed by springs or similar means and are opened by fluid under pressure delivered to the heads or diaphragm chambers 35, it being understood that the valves 33 may be constructed to be closed by the application of applied fluid pressure and opened by spring means, or the like.

The control 13 is responsive to the liquid levels in the tanks 15 to condition the registering units A' and B' for operation, to selectively open the valves 33 and to put the pump means 11 in operation. It is a feature of the invention that the means 13 automatically provides for the movement or transference of fluid from one source A or B to the manifold pipe 20 and through the meter 19, and provides for the operation of the related or correct registering unit A' or B' while positively preventing the delivery of fluid from any other source and positively preventing the operation of any other registering unit. The control 13 includes a fluid pressure operating system for operating the valves 33 and the cylinder and piston controls 26—27 of the registering units A' and B'.

The fluid pressure actuated system of the control 13 includes a source 36 of gas or air under pressure and a manifold pipe 37 extending from said source 36. The manifold pipe 37 delivers the gas or air under pressure to pipes 38 which in turn extend to the operating heads or diaphragm chambers 35 of the valve 33. There is a gas pressure supply pipe 38 extending to the diaphragm chamber 35 of each valve 33. Each pipe 38 has an extension line or pipe 39 communicating with it and extending to the port 28 of its respective register operating means 26—27.

A pilot valve V is connected in each pipe 38 to control the delivery of the air or gas under pressure to the valves 33 and the cylinder and piston means 26—27 of the register units A' and B'. The valves V are adapted for remote control or operation and are preferably electrically actuated. The invention contemplates the employment of any selected form of pilot valve V suited for electrical actuation. In the particular case illustrated the valves V comprise valve bodies interposed in the pipes 38 and provided with internal chambers 40. The bodies of the valves V have inlet ports 41 connected with the upstream sides of the pipes 38, outlet ports 42 connected with the downstream parts of the pipes 38 and bleed ports or vent ports 43 which are adapted to put the chambers 40 in communication with the atmosphere. Spring-urged or spring seated closures 44 are provided for the inlet ports 41 and similar spring actuated closures 45 are provided at the vent ports 43. The closures 44 and 45 seat inwardly or toward the chamber 40 and are aligned with one another in opposed relation. Levers 46 are pivotally mounted in the valves V and are arranged to extend between the inner ends of the stems 47 of the opposed aligned valve closures 44 and 45. Pivoting of a lever 46 in one direction opens the closure 44 and allows closing of the closure 45 while pivoting of the lever 46 in the other direction opens the closure 45 and allows closing of the closure 44.

Electro-magnetic means are associated with the valves V for the operation of their levers 46. Solenoids 48 are provided at each valve V and stems 49 on the armatures of the solenoids are operatively connected with the levers 46. The solenoid stems 49 may have pin and slot connections with the levers 46. When a solenoid 48 is de-energized or in the normal condition gravity holds the lever 46 in the position illustrated in Fig. 3 of the drawing where the closure 44 is in the closed position and the closure 45 is in the open position. Energization of a solenoid 48 results in the reversal of the closures 44 and 45, the closure 44 being opened and the closure 45 being closed.

The control 13 further includes an electrical control system governing energization of the solenoids 48 of the valves V and controlling energization of the motor 31 of the pump means 11. The electrical control system includes a float controlled switch 50 associated with each tank 15. Levers 51 are pivoted on the tanks 15 and carry floats 52 which are responsive to the liquid levels in the tanks. The float levers 51 extend from the tanks 15 to operate the switches 50. The switches 50 may be mercury tube switches mounted on or actuated by the float levers 51. As shown in Fig. 4 of the drawing, each switch 50 may comprise an elongate envelope or tube 53, spaced contacts 54 projecting into the tube 53, and a body 55 of mercury or other conducting liquid. When the liquid level in a tank 15 reaches a given plane the float operated lever 51 assumes a position where the conducting liquid 55 contacts or submerges both contacts 54.

The switches 50 control interconnected relay circuits, for governing the energization of the solenoids 48. The control 13 includes a relay for each source of fluid. In other words, where the metering apparatus serves to handle fluid from two sources A and B there are two relays. In the drawing I have designated the two relays A″ and B″, the relay A″ being operatively connected with the switch 50 of the source A to control the solenoid 48 of the valve V for governing the outlet pipe 18 of the source A and the relay B″ being under the control of the switch 50 at the source B and serving to control the solenoid 48 of the pilot valve V for the control of the valve 33 at the outlet pipe 18 of the course B. Each relay A″ and B″ includes two spaced pairs of contacts 56 and 57 and a switch element or contactor 58 for cooperating with the contacts. The switch elements or contactors 58 are operated by electromagnetic coils 59.

The relays A″ and B″ are interconnected so that the two valves 33 can never both be open at the same time. The control circuit of the fluid source A includes a conductor or lead 60 extending from one contact 54 of the switch 50 to a power lead P. A conductor or lead 61 extends from the other contact 54 of the switch 50, associated with the unit A, and passes to one of the contacts 56 of the relay B″. An interconnecting lead 62 extends from the other contact 56 of the unit B″ and is attached to one terminal of the coil 59 of the relay A″. A conductor or lead 63 extends from the other terminal of the coil 59 of the relay A″ to a power lead P. It will be seen that closing of the switch 50 at the source A results in the energization of the coil 59 of the relay A″ only in the event the relay B″ is in its normal unactuated condition.

The electrical control system associated with the source A further includes a lead 64 extending from one of the power lines P to an upper contact 57 of the relay A″ and a conductor or lead 65 extending from the other upper contact 57 of this relay to one terminal of the solenoid 48 of the valve V controlling discharge of fluid from the source A. A line or conductor 66 extends from the other terminal of said solenoid 48 to a power line P. When the coil 59 of the relay A″ is energized the contactor 58 moves into engagement with the contacts 57 to complete the circuit to the solenoid 48 of the pilot valve V which governs the outlet valve 33 of the unit A. From this it will be seen that operation of the relay A″ results in opening of the valve 33 so that fluid may discharge from the source A through the line 18 and the manifold line 20.

The control circuits associated with the source B include a line or lead 67 extending from a power line P to one of the contacts 54 of the switch 50 at the source B. A lead 68 extends from the other contact 54 of said switch 50 to one of the lower contacts 56 of the relay A″. An interconnecting lead 69 extends from the other contact 56 of the relay A″ to one terminal of the coil 59 of the relay B″. A line 70 passes from the other terminal of said coil 59 to a power line P. Closing of the switch 50 at the unit B results in the completion of the circuit through the operating coil 59 of the relay B″ when the relay A″ is in its normal de-energized condition. If the relay A″ is energized when the switch 50 of the source B closes the circuit to the relay B″ cannot be completed because the contactor 58 of the relay A″ is out of engagement with the contactors 56 of that relay and a circuit cannot be completed through the coil of the relay B″.

The relay B″ controlled by the switch 50 of the unit B, as described above, serves to govern the solenoid 48 of the pilot valve V which in turn governs the outlet 18 of the source B through the medium of its valve 33. The circuit for the control of the valve V associated with the source B includes a conductor or lead 71 extending from a power line P to one of the contacts 57 of the relay B″ and a lead 72 extending from the other contact 57 to a terminal of the solenoid 48. A lead 73 extends from the other terminal of said solenoid 48 to the other power line P. It will be seen that operation of the relay B″ completes the circuit to the solenoid 48 of the pilot valve V governing the discharge valve 33 of the source B. It is to be particularly noted that the interconnected relays A″ and B″ positively prevent the operation of the valve 33 or the conditioning of the meter register unit of one source when the other fluid source is delivering fluid to the common pipe or manifold pipe 20.

The control 13 further includes means for putting the pump means 11 into operation when any one of the valves 33 is opened. Where a gravity feed is utilized to transfer fluid from the sources A and B, the pump means 11 is not employed and the following control means for the pumping apparatus is not necessary. A relay or circuit breaking switch 74 is connected in the leads 32 of the motor 31 to control the pump means 11. The switch 74 is in turn controlled by switches 75 associated with the valves 33. The switches 75 may be of any selected type suitable for operation by a moving part of a valve. For example, the switches 75 may be mercury tube switches similar to the switches 50. As illustrated, the switches 75 may be carried or operated by levers 76 which in turn are operatively connected with the valve stems 34 for pivoting thereby. The switches 75 are connected in a two wire circuit 77—78. Where the motor 31 is operated by a three wire circuit as illustrated, the circuit 77—78 of the switches 75 may have a leg or lead 79 connected to one of the motor leads 32, say the common ground, and may have its second leg or lead 80 connected with the operating coil of the switch 74. A power lead 81 extends from the operating coil of the switch 74 to one of the power leads 32. When a valve 33 is opened its stem 34 operates or pivots the related lever 76 to close the switch 75. This completes the circuit to the switch 74 and the switch closes to complete the operating circuit of the motor 31. Thus the pump 30 is put into operation immediately following the opening of any one of the valves 33.

In the operation of the form of apparatus illustrated in the drawing it may be assumed that the tanks 15 of the sources A and B receive crude oil from separate or independent wells. The fluid from the wells flows into the tanks 15 and the valves 33 may remain closed until the liquid reaches a given level in the tanks. When a given liquid level is reached in a separator or tank 15, say the tank 15 of the source A, the float 52 in that tank brings the lever 51 to a position where the switch 50 closes. Closing of the switch 50 of the source A completes the electrical circuit through the operating coil 59 of the relay A″ assuming that the valve 33 of the source B is closed and the control circuits of the source B are idle. Operation of the relay A″ completes the circuit through the solenoid 48 of the pilot valve V associated with the valve 33 in the outlet line 18 of the source A. Energization of the solenoid 48 of this valve V results in the delivery of air or gas under pressure to the diaphragm chamber 35 of the valve 33 in the line 18 of the source A and the delivery of air or gas under pressure to the cylinder and piston means 26—27 of the register unit A′. The valve 33 is opened and the pinion 25 of the register unit A′ is brought into mesh with the gear 23 immediately following operation of the relay A″. When the valve 33, connected in the line 18 of the source A, opens the associated switch 75 closes to complete the energizing circuit of the switch 74 so that the pump means 11 is put into operation substantially concurrently with opening of said valve 33. The pump means 11 operates to transfer fluid from the source A to the pipe 20 so that it flows through the meter 19. The meter 19 drives the register A′ through the medium of the gearing 23—25, and the register unit A′ records or registers the amount of fluid delivered by the source A.

The source A may continue to discharge its liquid until the float 52 in the tank 15 reaches a given low-level position whereupon the switch 50 opens. Opening of the switch 50 causes de-energization of the coil 59 of the relay A″ so that the circuit to the solenoid 48 of the valve V is broken. When the solenoid 48 is de-energized the lever 46 of the pilot valve V returns to its normal position and the valve closure element 44 closes and the vent closure 45 opens. This causes the valve 33, governing the discharge from the source A, to close and disconnects the register unit A′ from the meter shaft 21. When the valve 33 closes the switch 75 opens to break the circuit to the switch 74 and the pump motor 31 is de-energized. Thus the various elements of the system are restored to their normal conditions when the liquid in the source A reaches a predetermined low-level.

The fluid is delivered from the source B and any other fluid sources with which the apparatus is associated in the same manner as from the source A. In each instance the single meter 19 operates to drive the respective or related register unit A′, B′, etc. so that the several fluid sources A, B, etc. are credited with their full productions or deliveries. In the event the float 52 reaches its switch closing position in the tank 15 of a fluid source at a time when another fluid source is discharging its liquid through the common pipe 20, the closing of the switch 50 cannot result in opening of the related valve 33 or conditioning of the related register unit A′, B′, etc. When a switch 50 at one source A or B is closed during the period of liquid discharge from another fluid source, the circuit from said switch cannot be completed because the circuit is broken at the contacts 56. In other words, the relays A″ and B″ are interconnected in such a manner that they cannot both be in operation or in an energized condition at the same time. This interconnected relation of the relays holds true regardless of the number of fluid sources and relays involved in the apparatus. The interconnected relation of the relays A″ and B″ positively prevents the concurrent delivery of fluid from two or more sources through the pipe 20 and the concurrent operation of two register units A′ and B′, etc. or the operation of a wrong register unit.

The fluid metering equipment of the present invention greatly reduces the apparatus required for the metering of fluid from a plurality of sources. The equipment eliminates the use of a separate meter and a separate pump for each well or fluid source and the single meter 19 and single pump 30 may serve to handle the fluid from a large number of sources. The apparatus is dependable and accurate in its metering function and is entirely automatic, requiring no manual attention.

Having described only a typical preferred form and application of my invention, I do not wish to be limited or restricted to the specific details herein set forth, but wish to reserve to myself any variations or modifications that may appear to those skilled in the art or fall within the scope of the following claims:

Having described my invention, I claim:

1. Apparatus for metering fluid from a plurality of fluid sources comprising a separate means for each of said sources for controlling the discharge of fluid therefrom, a meter connected to the several sources through a common conduit and operated by the fluid discharged by the several sources, a plurality of register units adapted to be individually operated by the meter, there being a register unit for each of said sources for registering the amount of fluid discharged therefrom, and a control responsive to conditions at the fluid sources operable to open any one of the separate means and to condition any one of the register units for operation by the meter.

2. Apparatus for metering fluid from a plurality of sources comprising a separate discharge valve means for each of the fluid sources, a single meter means arranged to handle the fluid from all of the sources, a separate register for each source adapted to be operated by the meter means, and a control responsive to conditions at said sources operable to open the valve means of any one of said sources and to operatively connect its respective register with the meter means for operation thereby while preventing the opening of the other valve means and operation of the other registers.

3. Apparatus for metering fluid from a plurality of sources comprising a discharge valve means for each of the fluid sources, a single meter means arranged to handle the fluid from all of the sources, a separate register for each source adapted to be operated by the meter means, pump means for pumping the fluid from the sources through the meter means, and control means responsive to the quantity conditions of the sources for opening the valve means of any one of the sources, for operatively connecting the related register with the meter means and for putting the pump means into operation while preventing the opening of the other valve means and the operation of the other registers.

4. Apparatus for metering the production from a plurality of wells comprising a tank for each well for receiving the fluid therefrom, a common manifold, discharge pipes leading from the tanks to the common manifold, a valve in each discharge pipe, a meter in the manifold, register means for registering the production from each well and adapted to be individually coupled with the meter for operation thereby, and a control responsive to the liquid levels in the tanks operable when a given liquid level is reached in a tank to cause opening of the valve of that tank and operable to couple the register means of that tank with the meter to be operated thereby while preventing the opening of the other valves and preventing operation of the other register means.

5. Apparatus for metering the production from a plurality of wells comprising separators for receiving the fluids from the wells, each separator being equipped with a liquid outlet pipe, and a valve controlling the outlet pipe, a common line for receiving the liquid from the several outlet pipes, a meter connected in the line to be operated by the liquid passing therethrough, a register unit for registering the amount of liquid discharged by each separator and adapted to be operatively connected with the meter for operation thereby, and a control responsive to the liquid levels in the separators operable when a given liquid level is reached in a separator to open the valve of said separator and to operatively connect the register unit of that separator with the meter for operation thereby while preventing opening of the other valves and operation of the other register units while said valve is open.

6. Apparatus for metering the production from a plurality of wells comprising separators for receiving the fluids from the wells, each separator being equipped with a liquid outlet pipe, and a valve controlling the outlet pipe, a common line for receiving the liquid from the several outlet pipes, a meter connected in said line to be operated by the liquid passing therethrough, a register unit for registering the amount of liquid discharged by each separator and adapted to be operatively connected with the meter for operation thereby, a single pump for transferring the liquid from the separators to said line to pass through the meter, means at each separator responsive to the liquid level therein, and control means governed by the last named means operable, when a given liquid level is reached in any one of the separators, to open the valve of said separator, to operatively couple the register unit of said separator with the meter and to put the pump into operation, and serving to prevent opening of the other valves and operation of the other register units when said valve is open.

7. Apparatus for metering the liquid production from a plurality of wells comprising a tank communicating with each well to receive the fluid therefrom, an outlet valve for each tank, a common line adapted to receive the liquid from the several tanks, a single meter mechanism operated by the flow through said line, a register means at the meter for each tank, a power system operable to selectively open the valves and operatively connect the register means with the meter mechanism for operation thereby, and a control for the power system comprising a means at each tank responsive to the liquid level therein, and interconnected relay means governed by the liquid level responsive means operable when a given level is reached in any tank to cause the power system to open the valve of said tank and to cause the register means of said tank to be operatively connected with the meter mechanism so that delivery from said tank is registered.

8. Apparatus for metering the liquid production from a plurality of wells comprising a separate tank communicating with each well to receive the fluid therefrom, an outlet valve for each tank, a common line adapted to receive the liquid from the several tanks, a single meter mechanism operated by the flow through said line, a register means at the meter for each tank, a power system operable to selectively open the valves and operatively connect the register means with the meter mechanism for operation thereby, and a control for the power system comprising a means at each tank responsive to the liquid level therein, relays governed by the last named means operable when a given level is reached in a tank to cause the power system to open the valve of said tank and operatively connect the register means of said tank with the meter mechanism so that the delivery from said tank is metered and registered, and interconnections between the relays preventing a second relay from operating when one relay is already in operation.

9. Apparatus for metering the liquid production from a plurality of wells comprising a separator tank communicating with each well to receive the fluid therefrom, an outlet valve for each tank, a common line adapted to receive the liquid from the several tanks, a single meter mechanism operated by the flow through said line, a register means at the meter for each tank, a fluid pressure operated control for each valve, a fluid pressure operated means for coupling each register means with the metering mechanism, a fluid pressure system for actuating the valve controls and the register coupling means, said system including pilot valves operable to actuate the valve controls and their related register coupling means, means at each tank responsive to the liquid level therein, and an electrical control system governed by the last named means and operated thereby when a given level is reached in a tank to cause operation of the pilot valve of said tank so that liquid from said tank passes through the meter mechanism and so that the register means for said tank registers such flow.

10. Apparatus for metering the liquid production from a plurality of wells comprising a separate tank communicating with each well to receive the fluid therefrom, an outlet valve for each tank, each valve having a fluid pressure actuated means for opening the same, float means at each tank responsive to the liquid level therein, a common line for receiving the fluid passed by the several valves, a metering mechanism in said common line, a separate register means at the metering mechanism for each tank, each register means having a fluid pressure actuated means operable to condition it for operation by the metering mechanism, a single pump for transferring the liquid from the tanks to said line for passage through the metering mechanism, a fluid pressure operating system for the first and second named fluid pressure actuated means including a pilot valve for each of the first named fluid pressure actuated means and its related second named fluid pressure actuated means, and an electrical control system under the control of the float means for operating a pilot valve when a given level is reached in a tank whereby the liquid from said tank is handled by the metering mechanism and its quantity is registered by the related register means.

11. Apparatus for metering the liquid production from a plurality of wells comprising a separate tank communicating with each well to receive the fluid therefrom, an outlet valve for each tank, each valve having a fluid pressure actuated opening means, float means at each tank responsive to the liquid level therein, a common line for receiving the fluid passed by the several valves, a metering mechanism in said common line, a separate register means for each tank, each register means having a fluid pressure actuated means operable to condition it for operation by the metering mechanism, a single pump for transferring the liquid from the tanks to said line for passage through the metering mechanism, a fluid pressure operating system for the first and second named fluid pressure actuated means including a pilot valve for each of the first named fluid pressure actuated means and its related second named fluid pressure actuated means, and an electrical control system under the control of the float means for operating a pilot valve when a given level is reached in a tank whereby the liquid from said tank is handled by the metering mechanism and its quantity is registered by the related register means, the electrical system comprising interconnected relays conditioned by the float means and related so that the energization of one relay renders the other relays inoperative.

12. Apparatus for metering the liquid production from a plurality of wells comprising a separate tank communicating with each well to receive the fluid therefrom, an outlet valve for each tank, each valve having a fluid pressure actuated means for opening the same, float means at each tank responsive to the liquid level therein, a common line for receiving the fluid passed by the several valves, a metering mechanism in said common line, a separate register means at the metering mechanism for each tank, each register means having a fluid pressure actuated means conditioning it for operation by the metering mechanism, a single pump for transferring the liquid from the tanks to said line for passage through the metering mechanism, means for operating the pump energized upon opening of any one of the valves, a fluid pressure operating system for the first and second named fluid pressure actuated means including a pilot valve for each of the first named fluid pressure actuated means and its related second named fluid pressure actuated means, and an electrical control system under the control of the float means for operating a pilot valve when a given level is reached in a tank whereby the liquid from said tank is handled by the metering mechanism and its quantity is registered by the related register means.

RICHARD A. WERTS.